US011084217B2

(12) United States Patent
Torrealba et al.

(10) Patent No.: US 11,084,217 B2
(45) Date of Patent: Aug. 10, 2021

(54) ILLUMINATION TECHNIQUES IN ADDITIVE FABRICATION AND RELATED SYSTEMS AND METHODS

(71) Applicant: Formlabs, Inc., Somerville, MA (US)

(72) Inventors: Eduardo Torrealba, Cambridge, MA (US); Brian Chan, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 56 days.

(21) Appl. No.: 15/970,247

(22) Filed: May 3, 2018

(65) Prior Publication Data
US 2018/0319084 A1 Nov. 8, 2018

Related U.S. Application Data

(60) Provisional application No. 62/502,567, filed on May 5, 2017.

(51) Int. Cl.
*B29C 64/364* (2017.01)
*B29C 64/153* (2017.01)
*B29C 64/25* (2017.01)
*B33Y 30/00* (2015.01)
(Continued)

(52) U.S. Cl.
CPC .......... *B29C 64/364* (2017.08); *B29C 64/153* (2017.08); *B29C 64/25* (2017.08);
(Continued)

(58) Field of Classification Search
CPC ....... B33Y 30/00; B33Y 40/00; B29C 64/264; B29C 64/25; B29C 64/295;
(Continued)

(56) References Cited

U.S. PATENT DOCUMENTS

| 5,313,373 A | 5/1994 | Bjorner et al. |
| 2007/0179656 A1* | 8/2007 | Eshed ................... G06F 17/50 700/119 |

(Continued)

FOREIGN PATENT DOCUMENTS

| DE | 10 2013 214320 A1 | 1/2015 | |
| DE | 102013214320 A1 * | 1/2015 | ........... B29C 64/153 |

OTHER PUBLICATIONS

International Search Report and Written Opinion for International Application No. PCT/US2018/030834 dated Jul. 11, 2018.
(Continued)

*Primary Examiner* — Philip C Tucker
*Assistant Examiner* — Jimmy R Smith, Jr.
(74) *Attorney, Agent, or Firm* — Wolf, Greenfield & Sacks, P.C.

(57) ABSTRACT

Techniques for illuminating an interior of an enclosure in an additive fabrication device are described. According to some aspects, an additive fabrication device includes a build region into which source material may be disposed and at least one source of electromagnetic radiation configured to direct radiation onto the source material in the build region to thereby form a layer of solid material from the source material. A first heater may be included that is configured to heat at least a portion of the source material in the build region. In some embodiments, an enclosure surrounds the build region and comprises a refractive aperture. In some embodiments, at least one light source is arranged to direct light into the enclosure through the refractive aperture.

13 Claims, 3 Drawing Sheets

(51) Int. Cl.
  *B29C 64/264* (2017.01)
  *B29C 64/218* (2017.01)
  *B22F 12/00* (2021.01)
(52) U.S. Cl.
  CPC ............ *B29C 64/264* (2017.08); *B22F 12/00* (2021.01); *B29C 64/218* (2017.08); *B33Y 30/00* (2014.12)
(58) Field of Classification Search
  CPC .... B29C 2035/0827; B29C 2045/0075; B29C 33/06; B29C 35/0805; B22F 3/1055; B22F 2003/1056; B22F 2003/1057; B22F 2003/1058; B22F 2003/1059; B22F 12/00
  See application file for complete search history.

(56) References Cited

U.S. PATENT DOCUMENTS

| | | | |
|---|---|---|---|
| 2009/0284983 A1* | 11/2009 | Levine | E21D 9/14 362/554 |
| 2009/0316385 A1 | 12/2009 | Weber et al. | |
| 2012/0000455 A1* | 1/2012 | Reinhard-Herrscher | F24C 15/008 126/19 R |
| 2017/0266728 A1* | 9/2017 | Johnson | B22F 3/1055 |
| 2018/0010237 A1* | 1/2018 | Forseth | C23C 14/24 |
| 2018/0326485 A1* | 11/2018 | Brown | B22F 3/1055 |
| 2018/0364156 A1* | 12/2018 | Atanasoff | G01N 21/3103 |

OTHER PUBLICATIONS

Gibson et al., Low-Cost Machine Vision Monitoring of the SLS Process. Solid Freeform Fabrication Proceedings. 1997. 10 pages.
International Preliminary Report on Patentability for International Application No. PCT/US2018/030834 dated Nov. 14, 2019.
Extended European Search Report dated Dec. 8, 2020 in connection with European Application No. 18794378.2.
Vulcaman, JRLS 1000 DIY SLS-3D-Printer. Nov. 9, 2016. 41 pages. URL:https://www.instructables.com/JRLS-1000-DIY-SLS-3D-printer [Retrieved on Nov. 27, 2020].

* cited by examiner

ILLUMINATION TECHNIQUES IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/502,567, filed May 5, 2017, titled "Selective-Laser Sintering Techniques And Related Systems And Methods," which is hereby incorporated by reference in its entirety.

FIELD OF INVENTION

The present invention relates generally to systems and methods for additive fabrication, e.g., 3-dimensional printing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built. In one approach to additive fabrication, known as selective laser sintering or SLS, solid objects are created by successively forming thin layers by selectively fusing together powdered material. An illustrative description of selective laser sintering may be found in U.S. Pat. No. 4,863,538, incorporated herein in its entirety by reference.

SUMMARY

According to some aspects, an additive fabrication device is provided configured to fabricate objects by forming layers of solid material from a source material, the additive fabrication device comprising a build region into which source material may be disposed, at least one source of electromagnetic radiation configured to direct radiation onto the source material in the build region to thereby form a layer of solid material from the source material, a first heater configured to heat at least a portion of the source material in the build region, an enclosure surrounding the build region, the enclosure comprising a refractive aperture, and at least one light source arranged to direct light into the enclosure through the refractive aperture.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
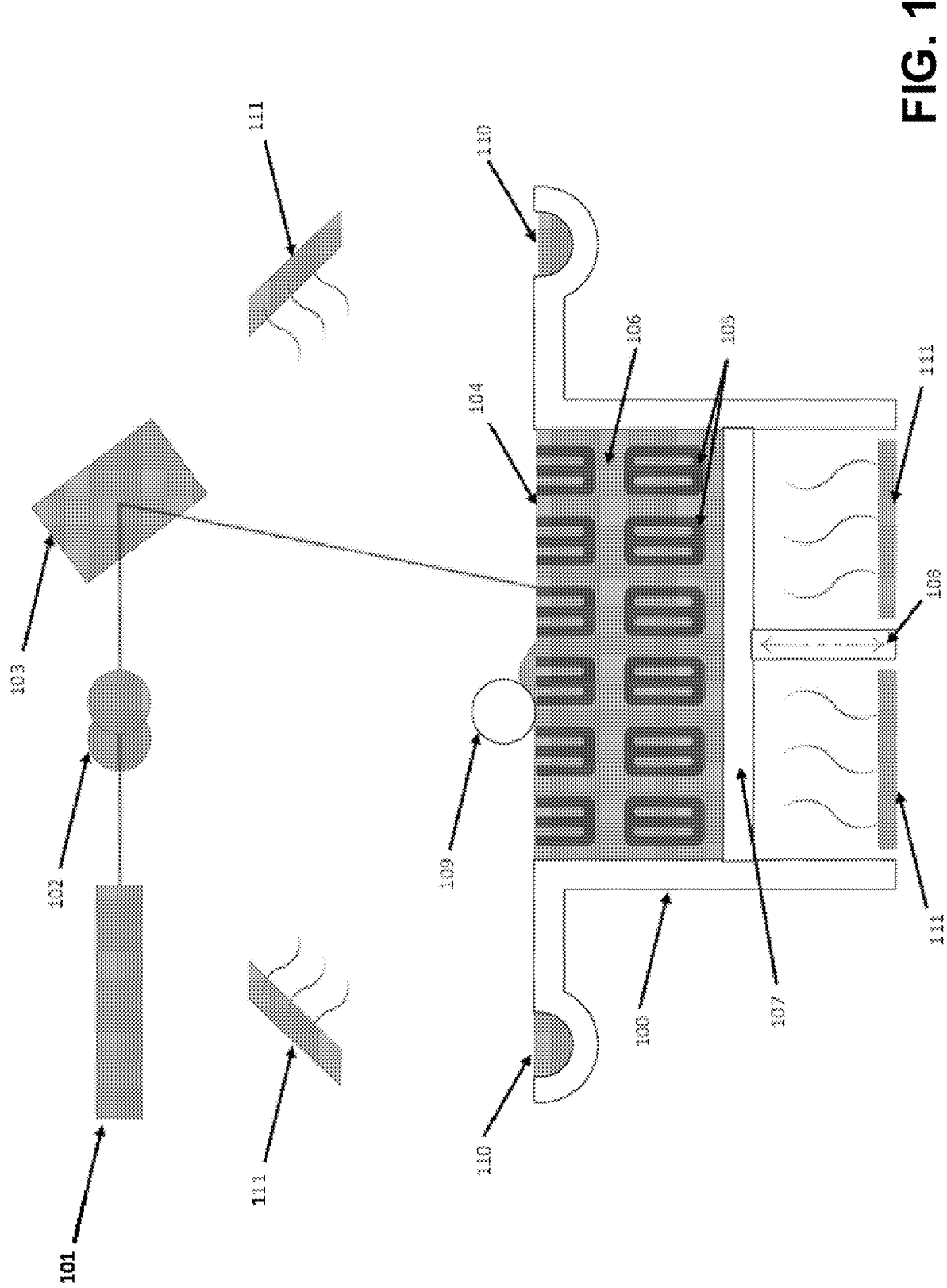
FIG. 1 is an illustrative depiction of selective laser sintering, according to some embodiments.

An illustrative system embodying certain aspects of the present invention is depicted in FIG. 1. The illustrated selective laser sintering system comprises a laser or other energy source 101 that is focused and guided through lenses and/or filters 102. The focused energy is paired with a computer-controlled scanner system 103 that may be operated to aim the focused energy at the fabrication powder bed 104 and move over an area of the bed to produce solid material for one or more objects 105, as described below. The area to which the focused energy is directed corresponds to a cross-section of an object to be formed. A series of such cross-sections may be determined from a computer aided design (CAD) model of the object, and by forming solid material according to these cross-sections, the object may be fabricated from a plurality of layers.

The focused energy (presumed to be a laser beam henceforth) may be directed by any form of scanning systems 103, including but not limited to mechanical gantries, linear scanning devices using polygonal mirrors, and/or galvanometer-based scanning devices. The material 106 in the fabrication powder bed 104 is selectively heated by the laser, and/or other source(s) of focusable energy, in a manner that causes the powder material particles to fuse into solid material. As discussed above, the solid material may represent a cross-sectional layer of an object 105 being fabricated. This process of fusing powder into solid material is sometimes also referred to as consolidation. A variety of suitable materials may be used as a source material of this fusing process, including various forms of powdered nylon materials.

Once a current layer has been successfully sintered, the fabrication platform 107 on which the object is being fabricated may be lowered a predetermined distance by a motion system 108. Once the fabrication platform 107 has been lowered, a material deposition mechanism 109 may be moved across the fabrication powder bed 104, spreading a fresh layer of material 106 across the fabrication bed 104 to be sintered as described above. Various mechanisms may apply a consistent layer of material onto the fabrication bed, such as wipers, rollers, blades, and/or other levelling mechanisms to move material from a source of fresh material. In the example of FIG. 1, a roller is pictured pushing powder from the powder delivery area 110 onto the fabrication powder bed 104.

Since material in the fabrication powder bed 104 is generally consolidated in only certain locations by the laser, the remaining material remains in the layer in an unconsolidated state 106. This unconsolidated material is often referred to as the "part cake" 106. In some embodiments, a part cake may physically support features of the object being fabricated, such as overhangs and/or thin walls, during the formation process, allowing for SLS systems to avoid the use of temporary mechanical support structures, which may be used in other additive manufacturing techniques such as stereolithography or fused deposition modeling. In addition, physical support supplied by unconsolidated material may enable parts with more complicated geometries, such as moveable joints or other isolated features, to be printed with interlocking but unconnected components.

The above-described process of consolidation may be repeated, thereby forming the object(s) 105 layer-by-layer until the entire object(s) 105 have been fabricated. Once the object(s) 105 have been fully formed by the method described above, the object(s) 105 and the part cake 106 may be cooled. Cooling may be performed at ambient temperatures, at a fast rate, or at a controlled rate so as to limit issues that may arise with comparatively faster cooling. The object and part cake may be cooled while within the selective laser sintering apparatus, or removed from the apparatus after fabrication to continue cooling. Once cooled, the object can be separated from the part cake by a variety of methods. The unused material in the part cake may optionally be recycled for use in subsequent prints.

In some instances it may be possible to raise the powdered material to its consolidation temperature by exposure to a laser or other focusable energy source 101 alone. In general, however, it may be preferred that the material layer be maintained at an elevated temperature, low enough to minimize thermal degradation, but high enough to require minimal additional energy exposure to trigger consolidation. Maintaining such an elevated temperature, sometimes known as "preheating," poses numerous technical challenges, however. In some embodiments it may be favorable to include heating elements 111 in strategic locations around the build volume to preheat and maintain temperature.

In many cases, consistency of the temperature of the unconsolidated material may be critical to the successful fabrication of parts using the selective sintering process, both over the full area to be exposed by the focused energy source and over an extended time period as additional exposures are completed. In particular, the system should preferably maintain the temperature of the consolidating material at or above its consolidation temperature for sufficient time for the consolidation process to complete. And, once the focused energy source 101 brings the powdered material 106 in the fabrication bed 104 to a temperature at or above the consolidation temperature, the system preferably maintains such a temperature in the required areas until the particles are able to fuse with their neighboring particles. In particular, these particles bind both to the other particles in their layer that are freshly melted or transitioned as well as the particles that may be above and below as the particles begin to cool. Additionally, the system would preferably maintain the temperature of the unconsolidated material at as close to a constant temperature as may be arranged, in order to ensure that the total amount of energy delivered to an area of unconsolidated material may be determined or be consistent for a given amount of focused energy exposed onto the unconsolidated material. Various techniques for preheating powdered material may be applied, including heating the material via radiative, conductive, or convective heating methods achievable through a variety of heating elements 111.

According to some aspects, a system for illuminating the interior of one or more build chambers may be provided. The inventors have recognized and appreciated that providing uniform illumination to the interior of the build chamber may be advantageous. For instance, such illumination may enable various process steps to be visually or optically monitored during operation, whether by an operator (e.g., directly through a window of the build chamber) or whether indirectly (e.g., via a camera positioned in the interior of the build chamber). In some cases, monitoring may be conducted by an automated process, such as an optical sensing system or computer vision system. The inventors have recognized and appreciated that, in general all such observations may benefit from the introduction of predictable, preferably uniform, illumination of the working areas of the build chamber.

The inventors have recognized and appreciated that uniform illumination may be particularly advantageous in applying computer vision algorithms to images and/or video captured by a camera positioned inside a build chamber. In particular, it may be advantageous for such techniques to providing even lighting whilst minimize any shadows cast within the chamber, particularly those cast by moving elements, such as a recoating system. Providing such uniform illumination, however, may present a challenge. Further, there are advantages to utilizing a source of illumination that occupies minimal space in order to minimize the overall size of the SLS device. Moreover, an illumination source may preferably utilize as few openings into the build chamber as is feasible in order to reduce the extent to which heat may escape from the build chamber.

While various lighting solutions are known in other fields, such as incandescent bulbs and LEDs, the build chambers of sintering and related devices may reach and maintain internal temperatures exceeding 200° C. for prolonged operating cycles. As those having skill in the art will appreciate, many lighting sources may be significantly degraded or destroyed by exposure to such temperatures. Conventional illumination solutions have typically relied upon incandescent light sources located within the build chamber, typically requiring both periodic replacement of bulbs and extensive insulation to protect the light source from the elevated temperatures of the build chamber. Such solutions have multiple deficiencies, however, including the need to allocate additional space within the build chamber of the light modules and their required insulation. And, even with such insulation, the use of certain light sources, such as LEDs, may be precluded due to temperatures exceeding operating tolerances, even within the insulated area.

Figure 2:
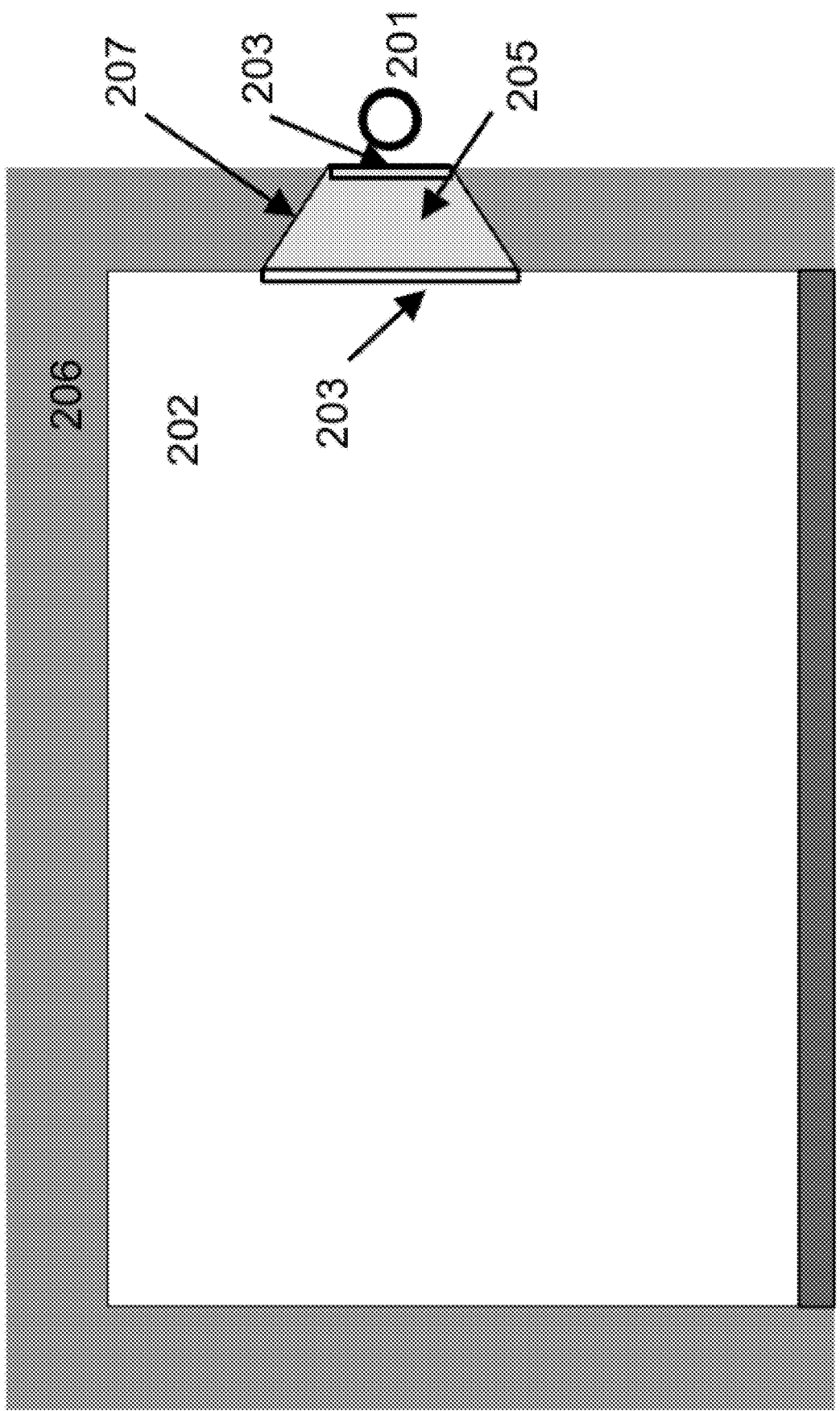
FIG. 2 depicts an illumination system using an external light source and a window, according to some embodiments.

The inventors have recognized and appreciated that a solution to the above problems may be to locate a source of illumination outside of the build chamber, in an area with lower temperatures than are present inside the build chamber, while allowing illumination from the source to enter the build chamber through a window or other such port. One example of such a solution is depicted in FIG. 2. As shown in the example of FIG. 2, one or more light sources 201, such as LEDs, may be located outside of the heated volume of the build chamber 202, in an external area that may be at a lower temperature than those found within the build chamber 202. The light source 201, and the area containing the light sources, is separated from the build chamber 202 by one or more windows 203. Such windows 203 are ideally transparent to the frequencies of the light source 201 and compatible with the operating temperatures found within the build chamber 202. In particular, a configuration having two windows as illustrated in FIG. 2 may provide for an insulative "dead" zone 205 to partially reduce heat transfer through the opening in the walls of the chamber 206. In some embodiments, not shown here, light source 201 may be alternatively located within the dead zone 205, such that the angle of light is more advantageous for exposure of the build platform 204 within the build chamber 202. Alternatively, or in addition, the sides of the dead zone 205 may be angled 207 so as to allow for light from light source 201 to reach a larger portion of the build platform 204 without being impeded by the side wall 206 of the chamber.

While the solution illustrated in FIG. 2 does address at least some of the deficiencies discussed above, several challenges remain. As one example, in at least some cases the opening for windows 203 must typically be significantly wider than the light source 201 in order to allow for sufficient light to enter and illuminate the build platform 204. Such openings may present a significant passage by which heat may be lost from the build chamber. And, while such heat losses are generally undesirable, the loss of heat may be particularly disadvantageous here, given that the heat lost may increase the temperature of the light source 201, causing degradation of any temperature-sensitive component therein. Moreover, the required size of the opening may limit the locations where the light source 201 may be located. In particular, the inventors have found that various design limitations typically require the light source 201 and opening to be positioned on side walls 206 of the build chamber, rather than on the wall above or opposite to the build platform 204. Such a side location is typically not desirable, as it may result in significant shadows and/or non-uniform illumination. While locating the window at the top of the build chamber, rather than a side, may partially address issues with shadows, it may cause or exacerbate other difficulties, such as increasing heat loss and/or requiring additional space to be allocated at the top of the chamber, where other components may need to be mounted.

Figure 3:
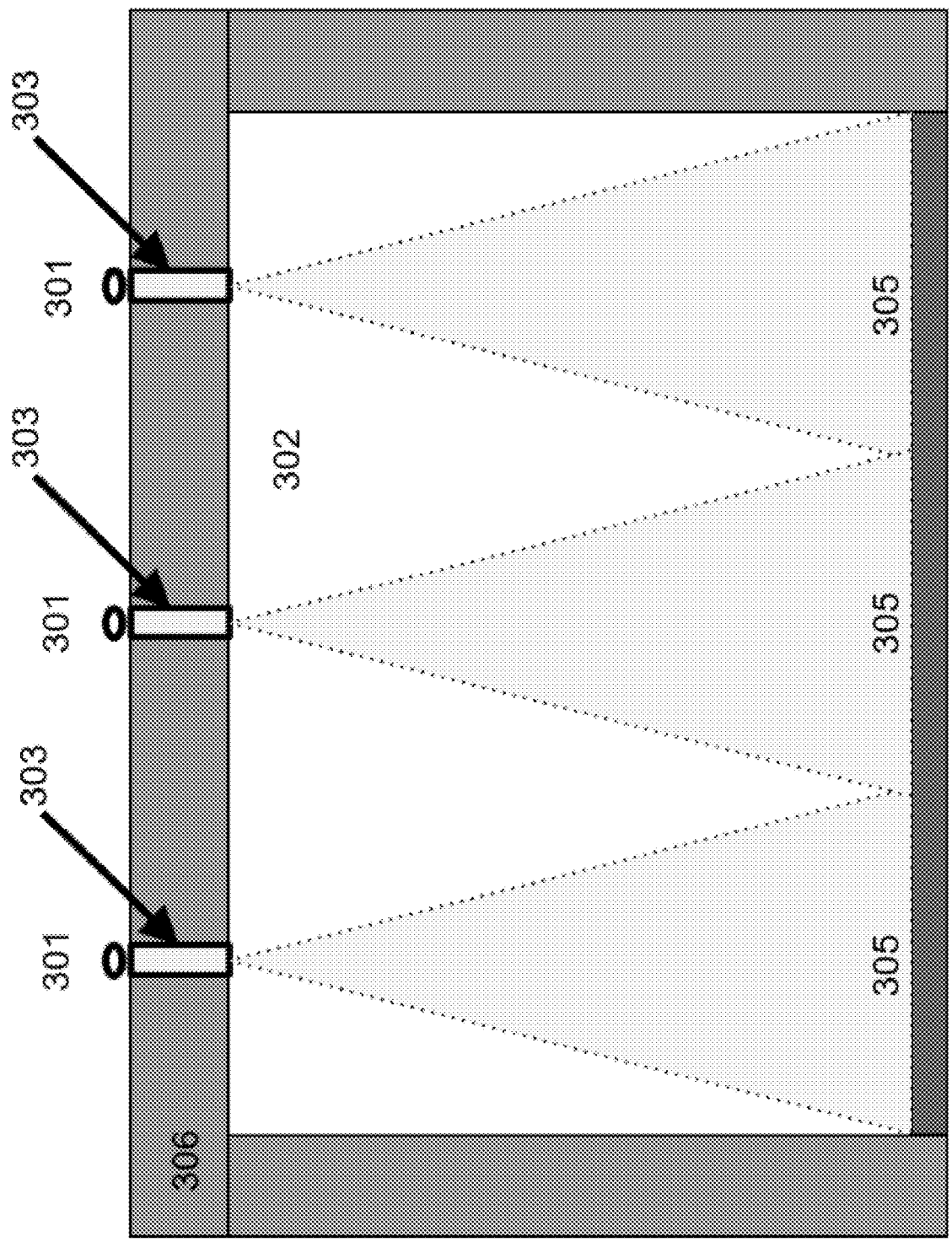
FIG. 3 depicts an illumination system using light pipes and an external light source, according to some embodiments.

In certain embodiments, such as illustrated in FIG. 3, the inventors have further improved upon the solution described above by utilizing a refractive aperture 303 made of a light transmitting material to conduct light from a light source 301 into the build chamber 302 from an exterior source. The refractive aperture 303 conducts light through at least a portion of the walls 306 of the build chamber so as to introduce light to the interior to the build chamber 302 from a light source 301 located outside of or within the walls of the chamber. In some embodiments, the refractive aperture 303 may comprise an optical waveguide, such as a cylinder of borosilicate glass and/or other suitable optical materials, transmitting light through its length via internal reflection. In some embodiments, the refractive aperture 303 may include reflective material disposed on at least a portion of the build chamber walls through which the aperture 303 extends. In such cases, materials other than borosilicate glass, such as a void or ambient atmosphere, may be located within the aperture 303 and all internal reflection provided via the reflective material on the sides of the aperture 303. For instance, the refractive aperture may be formed from a cylinder having an interior reflective coating. Light sources 301 may include any suitable light source, including one or more LEDs.

In some embodiments, a refractive aperture 303 may be formed from multiple, smaller refractive elements, such as may be provided by a bundle or cluster of fiber optic light conductors. In general, many such possible configurations of refractive apertures 303 may be possible or desirable; however, it may be particularly advantageous for the aperture 303, and the associated passage through the build chamber wall, to be of a minimal diameter or cross-sectional area. In the exemplary embodiment illustrated in FIG. 3, borosilicate light pipes of a diameter between 2 mm and 20 mm, or 5 mm and 15 mm, or 8 mm and 10 mm, may extend from a light source 301 for a sufficient length to end approximately flush to the interior surface of the build chamber 302. The use of refractive apertures 303 may advantageously allow for such passages to be significantly smaller than those used conventionally. As one example, a narrow refractive aperture 303, and thus passage, in the build chamber wall advantageously minimizes the thermal passthrough from the build chamber, and thus minimizes unwanted heat loss or transfer to the light source 301. Additionally, narrow refractive apertures 303 advantageously allow for multiple such light sources to be included for the build chamber while minimizing the space needed for such light sources. Accordingly, such light sources may be effectively incorporated at locations throughout the build chamber, including top and side surfaces.

Upon exiting the refractive aperture 303 within the build chamber 302, light from the light source module 301 may spread out to illuminate an area 305 of the build surface 304. Such a spread may be caused by diffractive effects or further modified by use of one or more lens or diffusers mounted within the refractive aperture 303 (e.g., at the build chamber end of the refractive aperture). Alternatively, in examples wherein the refractive aperture 303 is a composite formed by multiple individual light conducting elements, such as with a fiber optic bundle, the endpoint of each element at the build chamber end of the refractive aperture 303 may be configured to direct light in a particular direction. To the extent that the illuminated area from a given light module and refractive aperture is insufficient or does not cover the desired area of the build surface, however, the size advantages of certain embodiments of the invention may allow for additional light modules and accompanying refractive apertures to be positioned at multiple locations across the top surface or sides of the build chamber until the desired field and degree of illumination is achieved, such as is shown in FIG. 3.

In some embodiments, further compactness may be achieved by integrating the light source 301 with the refractive aperture 303, reducing both size and light loss. As one example, various light conductive materials may be coupled directly to the body or housing of an LED or similar light source, so as to conduct light efficiently from the LED to the final destination. Using such techniques, light source 301 may, in fact, be located within the walls of the build chamber, such as along the length of the refractive aperture shown in FIG. 3. In such cases, almost no space need be consumed by the lighting source 301 on the exterior of the build chamber enclosure, allowing for additional space efficiencies for the resulting device. In other embodiments, light sources 301 may be located a distance away from the build chamber and light conducted a significant distance from the light source before entering the chamber, such as may be achieved using a length of fiber optics or similar efficient optical transmissive material. In addition to allowing for increased flexibility in the positioning of the light sources 301, such a technique may be used in order to distribute the light from a single, possibly more efficient, light source 301 to multiple projection points within the build chamber.

In addition to the introduction of illumination into the build chamber, refractive apertures disclosed herein may be advantageously used to address other challenges. As one example, refractive apertures with sufficient transparency to infrared light may be incorporated so as to conduct infrared light into and out from the build chamber with minimal heat loss through other methods. These apertures may be coupled to one or more devices configured to measure an amount of infrared light. Accordingly, measurements of internal temperatures within the build chamber may be conducted by measuring the amount of infrared light entering the build chamber end of the refractive aperture using the devices (e.g., devices located at the external end of the aperture). Alternatively, infrared light may be introduced from a light source outside of the build chamber, through the refractive aperture, in order to elevate or maintain a given temperature within the build chamber through radiative heating. In such cases, the area to be measured or heated may be further controlled by means of directing or focusing elements located at the end of the refractive aperture, such as described above, which target particular regions within the build chamber. In some embodiments, refractive apertures may also be utilized in order to visually observe activity within the build chamber, such as by using fiber optics to convey images from the interior of the build chamber to a camera or other observation equipment.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions may be described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to fabricate objects by forming layers of solid material from a polymeric source material, the additive fabrication device comprising:
   a material bed onto which the polymeric source material may be disposed;
   at least one source of electromagnetic radiation configured to direct radiation onto the polymeric source material in the material bed to selectively heat a portion of the polymeric source material and thereby form a layer of solid material from the polymeric source material;
   a first heater arranged proximate to the material bed and configured to heat at least a portion of the polymeric source material in the material bed;
   an enclosure surrounding the material bed, the enclosure comprising an optical waveguide; and
   at least one light source, distinct from the at least one source of electromagnetic radiation, arranged to direct light into the enclosure through the optical waveguide to illuminate the material bed within the enclosure.

2. The additive fabrication device of claim 1, wherein the at least one light source is arranged within at least one wall of the enclosure.

3. The additive fabrication device of claim 2, wherein the at least one light source is arranged at least partially within the optical waveguide.

4. The additive fabrication device of claim 1, wherein the at least one light source is arranged external to the enclosure.

5. The additive fabrication device of claim 1, wherein the optical waveguide comprises borosilicate glass.

6. The additive fabrication device of claim 1, wherein the optical waveguide comprises a reflective coating.

7. The additive fabrication device of claim 6, wherein the optical waveguide comprises a refractive material and wherein the reflective coating is applied as a coating to the refractive material.

8. The additive fabrication device of claim 1, wherein the enclosure comprises a plurality of optical waveguides.

9. The additive fabrication device of claim 8, wherein the plurality of optical waveguides include optical waveguides within opposing faces of the enclosure.

10. The additive fabrication device of claim 1, wherein the at least one light source includes one or more light emitting diodes (LEDs).

11. The additive fabrication device of claim 1, wherein the optical waveguide comprises a plurality of optic fibers.

12. The additive fabrication device of claim 1, wherein the optical waveguide has a diameter between 2 mm and 20 mm.

13. The additive fabrication device of claim 1, wherein the optical waveguide comprises a light pipe.

* * * * *